United States Patent
Kapulka et al.

(10) Patent No.: US 6,910,153 B2
(45) Date of Patent: Jun. 21, 2005

(54) METHOD AND SYSTEM FOR RECOVERY FROM A COUPLING FACILITY FAILURE WITHOUT PREALLOCATING SPACE

(75) Inventors: Kenneth Michael Kapulka, San Jose, CA (US); Marc Kenneth Duquette, San Jose, CA (US); Kelly Scott Carpenter, Elgin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/039,355

(22) Filed: Jan. 3, 2002

(65) Prior Publication Data

US 2003/0126497 A1 Jul. 3, 2003

(51) Int. Cl.[7] .............................................. G06F 11/00
(52) U.S. Cl. .......................................... 714/8; 711/162
(58) Field of Search .............................. 714/8, 5–7, 2, 714/11–13, 54, 718, 770; 711/113, 114, 118, 162

(56) References Cited

U.S. PATENT DOCUMENTS

| | | | | | |
|---|---|---|---|---|---|
| 5,615,329 A | * | 3/1997 | Kern et al. | ..................... | 714/6 |
| 5,771,367 A | * | 6/1998 | Beardsley et al. | ........... | 711/162 |
| 6,662,307 B1 | * | 12/2003 | Sipple et al. | ................... | 714/2 |
| 6,671,705 B1 | * | 12/2003 | Duprey et al. | .............. | 707/204 |
| 6,748,488 B2 | * | 6/2004 | Byrd et al. | .................. | 711/114 |

* cited by examiner

Primary Examiner—Dieu-Minh Le
(74) Attorney, Agent, or Firm—Kunzler & Associates

(57) ABSTRACT

A method and system for transparently recovering from a coupling facility failure are disclosed. In one method embodiment, the present invention determines, following the failure of a coupling facility, which data was previously assigned to that coupling facility. The present embodiment then prevents access to that failed coupling facility. Next, the present method embodiment selects a new storage location for the data which was previously assigned to the failed coupling facility. The present embodiment then assigns the data previously assigned to the failed coupling facility to a new storage location. In the present invention, the aforementioned steps are performed without requiring preallocation of white space in an alternate coupling facility.

45 Claims, 6 Drawing Sheets

METHOD AND SYSTEM FOR RECOVERY FROM A COUPLING FACILITY FAILURE WITHOUT PREALLOCATING SPACE

FIELD OF THE INVENTION

The present claimed invention relates to the field of data storage. More particularly, the present claimed invention relates to a method for recovering from a coupling facility failure without preallocating space.

BACKGROUND ART

In certain computer processing configurations, multiple systems are coupled together to execute workloads. One such system is a S/390 parallel sysplex configuration available from International Business Machines Corporation of Armonk, New York. The coupling of the multiple systems is achieved with shared direct access storage devices (DASD), and a shared global cache which is termed the coupling facility. Access to the shared global cache is significantly faster than access to shared DASD.

With reference now to Prior Art FIG. 1, a schematic diagram of a conventional parallel sysplex configuration 100 is shown. Parallel sysplex configuration 100 includes three systems, system 1 102, system 2 104, and system 3 106. Each of the three systems is coupled to a shared DASD 108. In addition, parallel sysplex configuration 100 includes two coupling facilities, coupling facility 110 and coupling facility 112. As noted in Prior Art FIG. 1, coupling facility 110 is referred to as the primary coupling facility and coupling facility 112 is referred to as the alternate coupling facility. Each of the two coupling facilities are coupled to each of the three systems, system 1 102, system 2 104, and system 3 106. Although a particular conventional parallel sysplex configuration 100 is shown in Prior Art FIG. 1, the following discussion pertains to parallel sysplex configurations having various implementations including a lesser or greater number of elements. Parallel sysplex configuration 100 is designed for high availability. That is, a loss of a hardware element in parallel sysplex configuration 100 will reduce workload resources, but the workload continues to execute without disruption. Hence, should one of the multiple systems (e.g. system 1 102) of parallel sysp0lex configuration 100 experience some type of failure or become inoperable, the various other systems (e.g. system 2 104 and system 3 106) will still function. As a result, tasks being performed prior to the failure of system 1 102 will continue to be performed using at least some of the remaining systems of parallel sysplex configuration 100.

With reference still to Prior Art FIG. 1, each coupling facility's physical storage is divided into units termed cache structures. A cache structure is associated with a specific application, for example VSAM RLS (virtual storage access method record level sharing), DB2, etc. A given application such as VSAM RLS may have multiple cache structures residing in the same or different coupling facilities.

As an overview, during operation data is buffered locally in each system's memory (local cache). Local cache is illustrated for system 1 102, system 2 104, and system 3 106 as local cache 114, local cache 116, and local cache 118, respectively. Access to the system's local cache is significantly faster than access to the shared global cache (coupling facility 110 and coupling facility 112), or shared DASD 108. When a data item is read from shared DASD 108, a copy is placed in both the local cache and the global cache. The coupling facility is vital to this operation because the coupling facility provides faster access to the data item. More specifically, associated with the data item is a vector index. If the data item is changed, old copies of the data item are invalidated by the coupling facility by changing a bit associated with the vector index from "valid" to "invalid". Hence, the operation of the coupling facility is essential to a parallel sysplex configuration.

Unfortunately, conventional parallel sysplex configuration 100, and, more particularly, coupling facility implementation therein, has significant drawbacks associated therewith. As an example, typically two coupling facilities 110 and 112 are employed to ensure availability even if a coupling facility outage occurs. Currently, when a coupling facility fails (e.g. primary coupling facility 110), a rebuild process is used to perform the recovery action. The rebuild process involves allocating reserved space in the alternate coupling facility (e.g. alternate coupling facility 112) at the time of the failure for each cache structure in the failed coupling facility. Therefore, to ensure that this rebuild process will be successful, and to ensure that workload performance will not be significantly degraded once the switch to alternate coupling facility 112 is complete, alternate coupling facility 112 must have reserved space ("white space") for the rather rare event of a coupling facility failure. Hence, a conventional parallel sysplex configuration 100 has a backup or alternate coupling facility to ensure expedient and accurate recovery from a coupling facility failure, and the alternate coupling facility is used primarily to reserve white space.

With reference still to Prior Art FIG. 1, in a conventional parallel sysplex configuration 100, the primary coupling facility 110 and the alternate coupling facility 112 typically have approximately the same amount of data storage space. That is, alternate coupling facility 112 must have approximately the same amount of space (e.g. cache structure 122) as the primary coupling facility (e.g. cache structure 120) so that an amount of white space can be reserved in alternate coupling facility 112 wherein the reserved white space is approximately equal to the amount of assigned space in primary coupling facility 110. Thus, in a conventional parallel sysplex configuration, at least one alternate coupling facility sits mostly unused, containing allocated white space, and waits for the primary coupling facility to fail. Although high availability is important, such a duplication of coupling facilities drastically increases equipment expenses, significantly increases the physical space occupied by the coupling facilities, and "wastes" potentially valuable data storage space due to the allocation of white space in at least one of the coupling facilities.

Referring now to Prior Art FIG. 2, a block diagram 200 illustrating the aforementioned drawbacks associated with coupling facility implementation in a conventional parallel sysplex configuration is shown. As shown in FIG. 2, for purposes of illustration, primary coupling facility 110 has two cache structures cache 202 and cache 204. Additionally, in FIG. 2, alternate coupling facility 112 has two cache structures cache 206 and cache 208. In a conventional parallel sysplex configuration cache structures cache 206 and cache 208 remain allocated as white space and are reserved for the rather rare event of a failure of coupling facility 110. Hence, cache structures cache 206 and cache 208 remain unused.

As yet another concern, in order to achieve widespread acceptance, and to ensure affordability, any method of recovering from a coupling facility failure, which overcomes the above-listed drawbacks, should be compatible with existing parallel sysplex configurations.

Thus, a need exists for a method and system for recovering from a coupling facility failure. Still another need exists for a method and system which meets the above need and which does not require allocating white space in a separate and duplicative coupling facility. Yet another need exists for a method and system which meets the above needs and which is compatible with an existing parallel sysplex configuration.

SUMMARY OF INVENTION

The present invention provides, in various embodiments, a method and system for transparently recovering from a coupling facility failure. The present embodiments also provide a method and system which achieve the above while not requiring the allocating of white space in a separate and duplicative coupling facility. The present embodiments also provide a method and system which achieve the above accomplishments and which are compatible with an existing parallel sysplex configuration.

In one embodiment, the present invention determines, following the failure of a coupling facility, which data was previously assigned to that coupling facility. The present embodiment then prevents access to that failed coupling facility. Next, the present method embodiment selects a new storage location for the data which was previously assigned to the failed coupling facility. The present embodiment then assigns the data previously assigned to the failed coupling facility to a new storage location. In the present invention, the aforementioned steps are performed without requiring preallocation of white space in an alternate coupling facility.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

PRIOR ART

PRIOR ART

Figure 1:
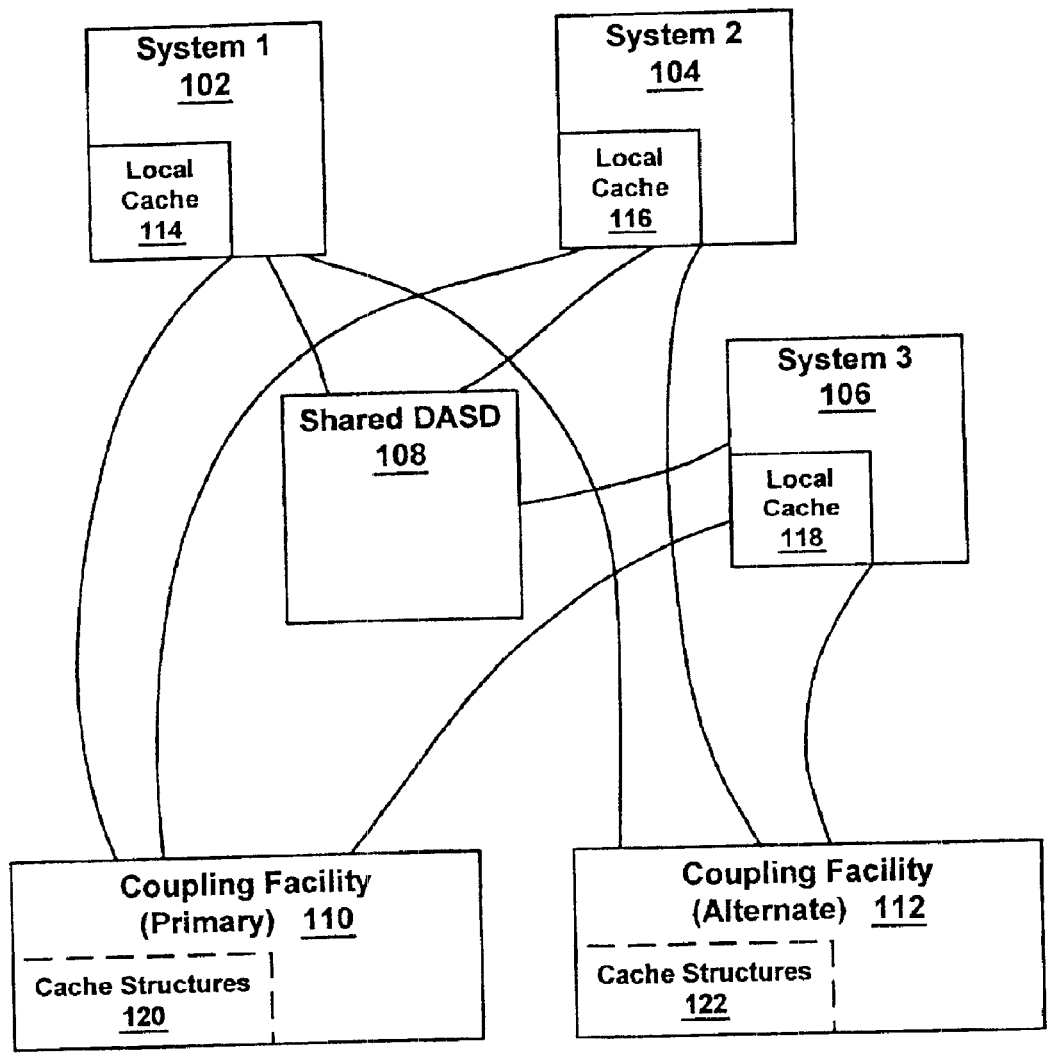
FIG. 1 is a schematic diagram of a conventional parallel sysplex configuration in which an alternate coupling facility has white space reserved therein.
Figure 2:
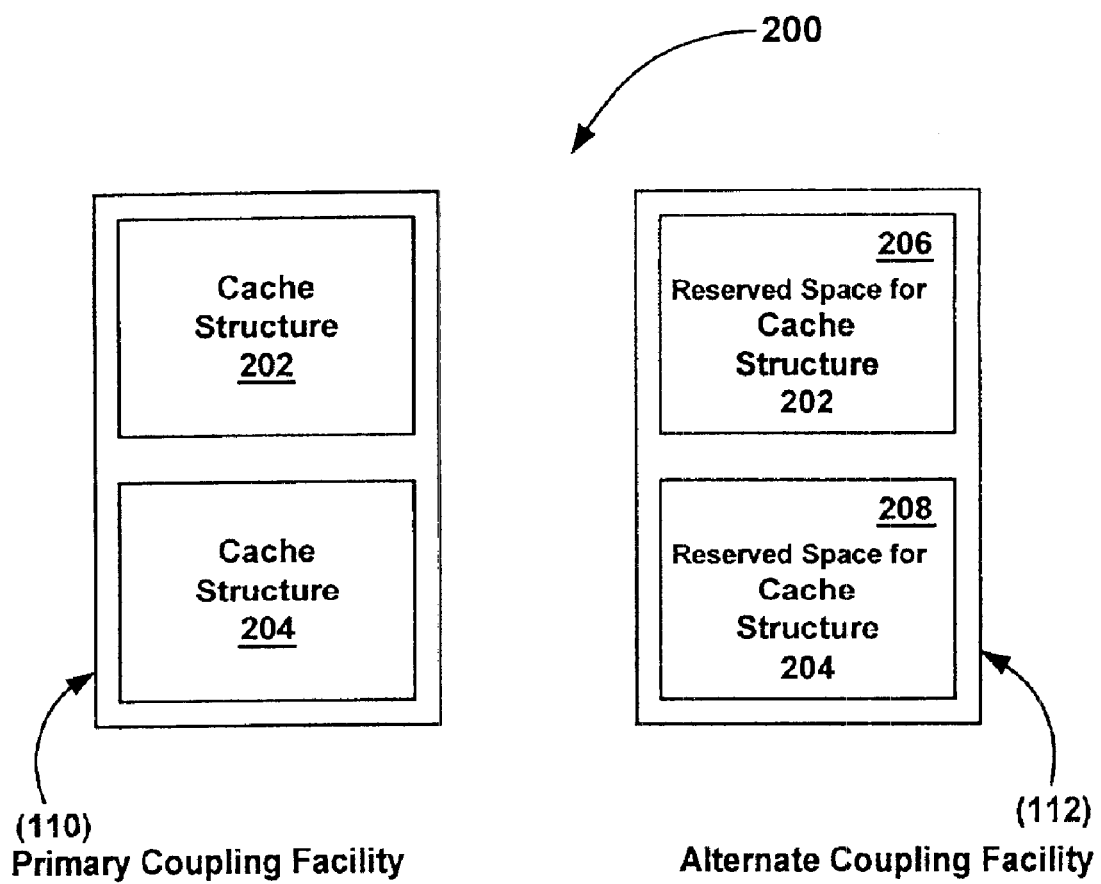
FIG. 2 is a schematic diagram of two coupling facilities employed in a conventional parallel sysplex configuration in which the alternate coupling facility has white space reserved therein corresponding to the used space in the primary coupling facility.

The drawings referred to in this description should be understood as not being drawn to scale except if specifically noted.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining", "preventing", "selecting", "assigning" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

The various embodiments of the present invention will be described below in conjunction with a detailed description of the steps of flow charts 500 and 600 of FIG. 5 and FIG. 6, respectively, and a detailed description of FIGS. 3 and 4. As a brief overview, the various embodiments of the present invention provide a method and system for recovering from a coupling facility failure without requiring preallocation of white space in an alternate coupling facility. That is, as will be described in detail below, the present invention eliminates the need for a "primary" and an "alternate" coupling facility scheme, and, more importantly, the present invention eliminates the need to allocate reserved white space in any coupling facility.

Figure 3:
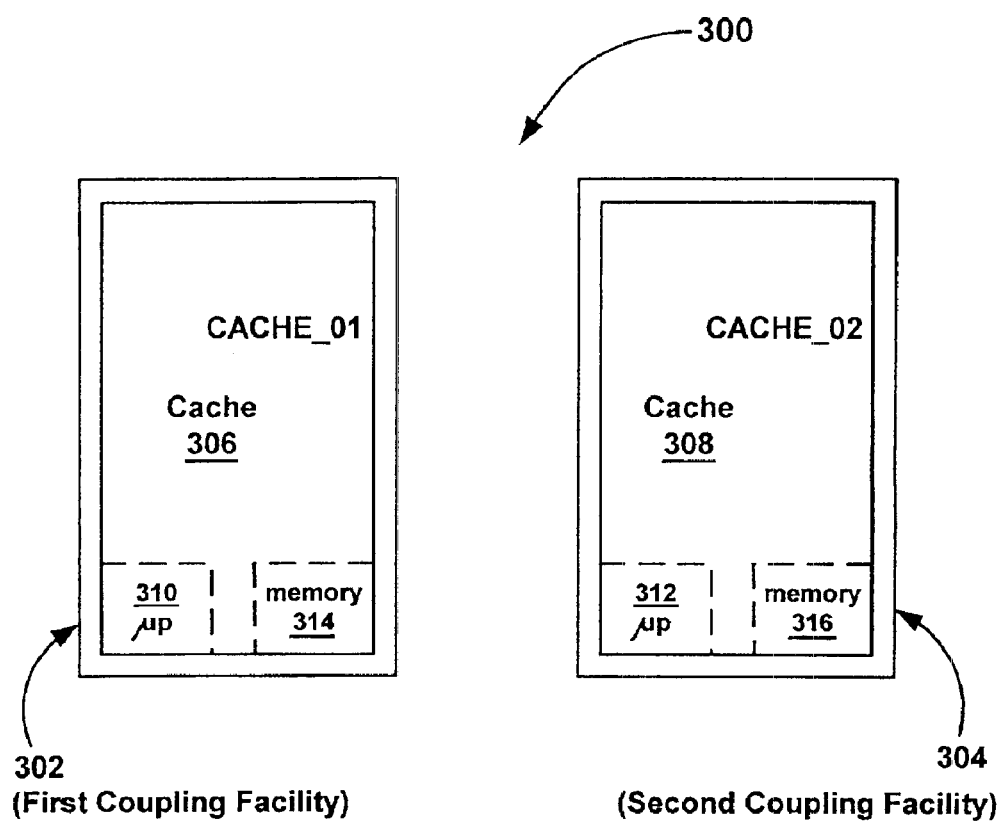
FIG. 3 is a schematic diagram of two coupling facilities employed in a parallel sysplex configuration in which coupling facilities do not have white space reserved therein in accordance with one embodiment of the present claimed invention.

With reference now to FIG. 3, a schematic diagram is shown of a first coupling facility 302 and a second coupling facility 304 employed in a parallel sysplex configuration which neither first coupling facility 302 nor second coupling facility 304 have white space reserved therein in accordance with one embodiment of the present claimed invention. As shown in the embodiment of FIG. 3, first coupling facility 302 includes a cache structure also referred to as cache 306. Similarly, second coupling facility 304 includes a cache structure also referred to as cache 308. First coupling facility 302 also includes a processor 310 and memory 314. Likewise, in the present embodiment, second coupling facility 304 also includes a processor 312 and memory 316. As will be described below, processes of the present method and system for recovering from a coupling facility failure are, in one embodiment, a series of steps. In one embodiment, the series of steps are carried out by a processor under the control of computer-readable and computer-executable instructions. The computer-readable and computer-executable instructions reside, for example, in data storage features such as memory 314 and/or 316. The computer-readable and computer-executable instructions are used to control, for example, the operation and functioning of processors 310 and 312 of first coupling facility 302 and second coupling facility 304, respectively. In one embodiment, the present invention is implemented both with the processor and memory in the coupling facility (310, 314, for example) and the processor and memory in, for example, system 102 of FIG. 1 which contains the control structures shown in FIG. 4.

Figure 4:
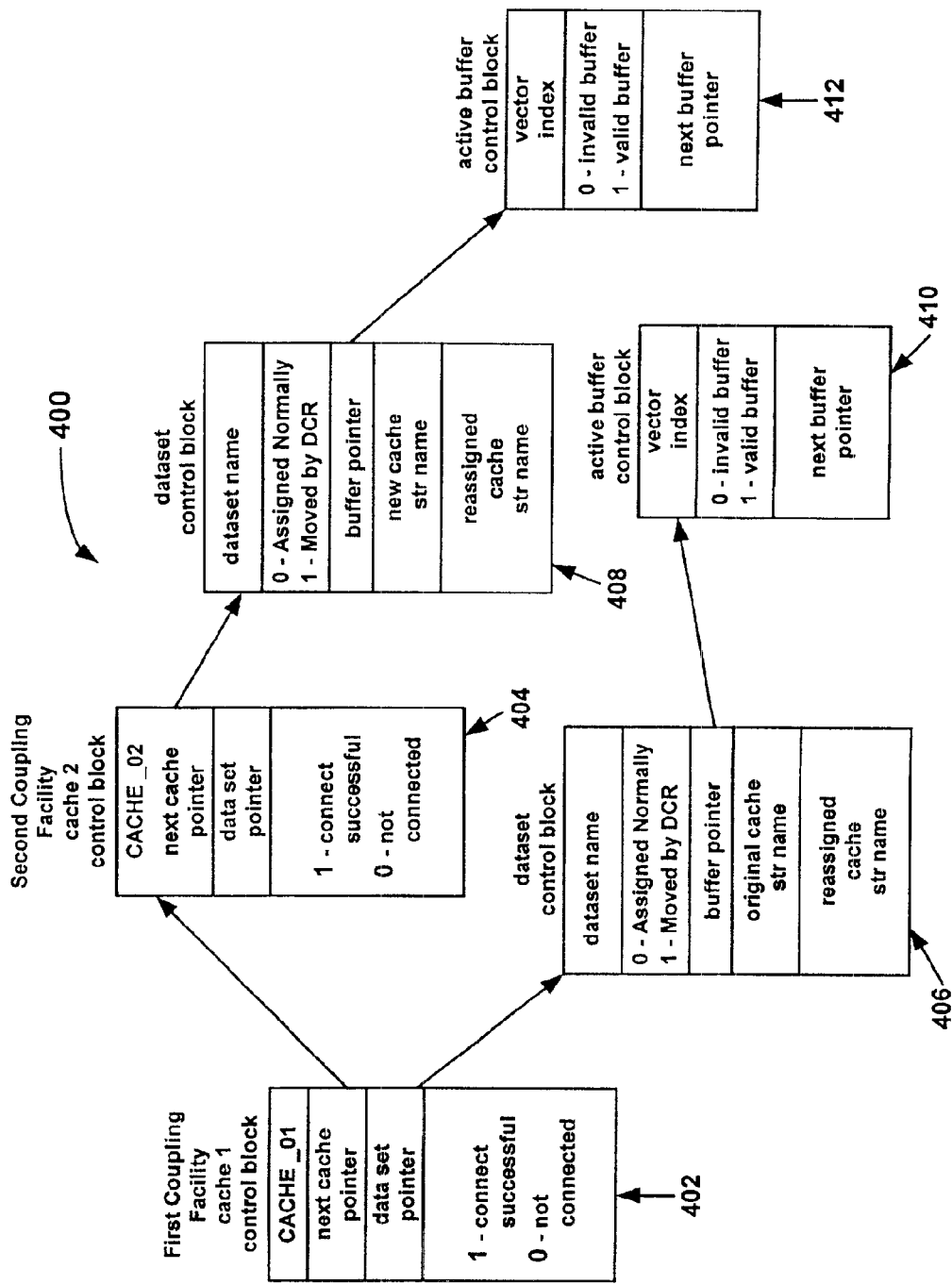
FIG. 4 is a block diagram of a coupling facility cache control block structure employed in accordance with one embodiment of the present claimed invention.

With reference next to FIG. 4, block diagram of a coupling facility cache control block configuration 400 employed in accordance with one embodiment of the present claimed invention is shown. Cache control block configuration 400 is used to represent a cache structure and provides the anchors (i.e. the memory address of a first set of linked information) for all information related to the cache structure. Cache control block configuration 400 includes first coupling facility cache control block structure 402 and second coupling facility cache control block structure 404. Cache control block configuration 400 further includes dataset control block structure 406 (coupled to first coupling facility cache control block structure 402), and dataset control block structure 408 (coupled to second coupling facility cache control block structure 404). Additionally, cache control block configuration 400 further includes an active buffer control block 410 (coupled to first coupling facility cache control block structure 402), and an active buffer control block 412 (coupled to second coupling facility cache control block structure 404).

In the present embodiment, data, also referred to as a "dataset", is assigned to a specific cache structure. As an example, data or a dataset can be assigned to CACHE_01 of first coupling facility 302. The process of determining what cache structure a particular dataset is assigned to is referred to as "nominate cache". The process consists of determining a normalized value which represents the size of the cache structure and the rate of requests to the cache structure. Typically, the nominate cache process attempts to select the least busy cache structure based on this normalized value.

Once a dataset has been assigned to a particular cache structure, the dataset is represented by the dataset control block structures (e.g. dataset control block structure 406 or dataset control block structure 408) anchored to that particular cache control block structure (i.e. contains a memory address of a first set of linked information).

As data is read in from the dataset, local (in memory) buffers are assigned, each associated with a vector index. The list of the assigned vector indexes is maintained in an active buffer control block structure anchored to a corresponding dataset control block structure. As an example, in cache control block configuration 400 of FIG. 4, active buffer control block structure 410 is anchored to dataset control block structure 406. Similarly, active buffer control block structure 412 is anchored to dataset control block structure 408.

Hence, during typical operation, a cache control structure is created to represent a cache structure and anchor all information relative to that cache structure. Additionally, datasets are assigned to available cache structures based on a process, nominate cache, that selects the least busy cache. A dataset control structure is anchored to the cache control structure. Also, when a buffer is assigned to a dataset, the vector index associated with the buffer is anchored in the dataset control structure.

Figure 5:
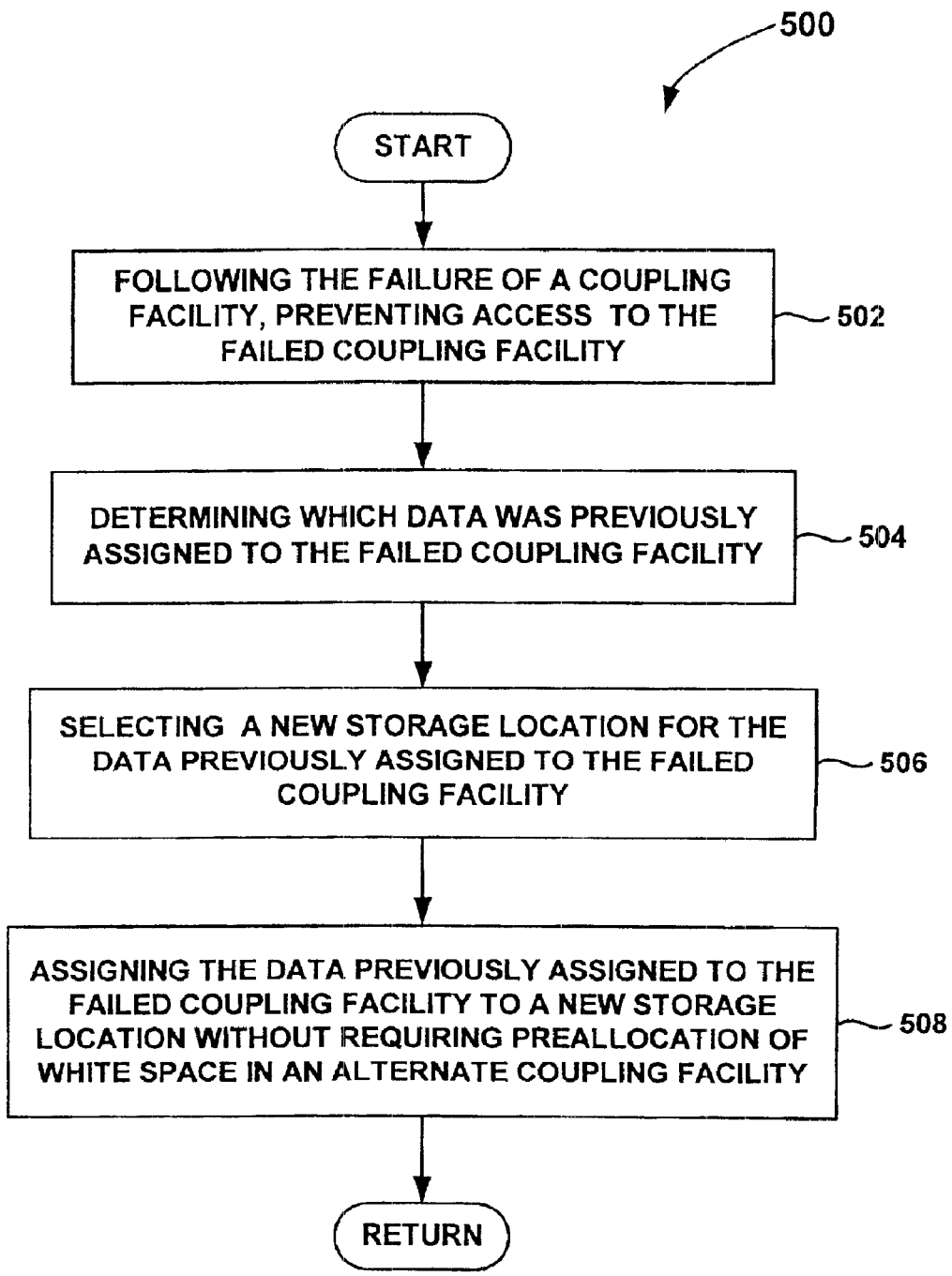
FIG. 5 is a flow chart of steps performed in accordance with one embodiment of the present claimed invention.

With reference now to FIG. 5, a flow chart 500 of steps performed in accordance with one embodiment of the present method for recovering from a coupling facility failure is shown. At step 502, following the failure of a coupling facility, the present embodiment prevents access to failed first coupling facility 302. In one embodiment, the coupling facility failure occurs in a parallel sysplex configuration. More specifically, in one embodiment, the present invention obtains serialization on the cache control structure (e.g. cache control block structure 402) corresponding to failed first coupling facility 302 to prevent access to failed first coupling facility 302. By obtaining serialization, the present invention stops any read or write access to failed first coupling facility 302 and prevents the assignment of new data (e.g. a new dataset or datasets) to failed first coupling facility 302. Additionally, as will be further described in conjunction with step 506 of FIG. 5, obtaining serialization on cache control block structure 402 prevents access while the process of dynamic cache reassignment is being executed.

Next, as recited in step 504 of FIG. 5, the present embodiment determines which data (e.g. which dataset or datasets) was previously assigned to the failed coupling facility. In one embodiment of the present invention, this step is performed by analyzing a cache control structure (e.g. cache control block structure 402 or cache control block structure 404 of FIG. 4) corresponding to the failed coupling facility to determine which of the data or datasets were previously assigned to failed first coupling facility 302. For purposes of clarity and explanation, the following discussion assumes that first coupling facility 302 of FIG. 3 fails. The following discussion will also assume that only two coupling facilities are present. It should be noted, however, that the present invention is also well suited to use with more than two coupling facilities and to the failure of a coupling facility other than the first coupling facility.

Referring now to step 506, the present embodiment then selects a new storage location for the data previously assigned to failed first coupling facility 302. In one embodiment, a nominate cache process is performed to select the new storage location for the data previously assigned to failed first coupling facility 302. That is, each dataset, or datasets, assigned to first coupling facility 302 at the time of the failure now go through the nominate cache process to select a second available cache structure. Importantly, failed first coupling facility 302 will not be selected as part of this nominate cache process because its cache control block structure 402 has been flagged as "not connected". Hence, the nominate cache process will ensure the full utilization of the cache structure resources which are available at the time of the failure of first coupling facility. It is important to note that, unlike conventional approaches, the present invention does not simply reassign the dataset, or datasets, assigned to first coupling facility 302 at the time of the failure, to reserved white space in the second coupling facility. To the contrary, in the present invention, there is no preallocation of or any white space present in second coupling facility 304. As a result, the present invention does not waste resources or limit the utilization of "unfailed" coupling facilities by allocating white space.

Referring now to step 508, the present invention then assigns the dataset or datasets previously assigned to failed first coupling facility 302 to a new storage location. The new storage location can reside, for example, in a second coupling facility (e.g. second coupling facility 304), or the like. As mentioned above, in the present invention, steps 502 through 508 are all performed without requiring preallocation of white space in second coupling facility 304. More specifically, in one embodiment of the present invention, the dataset or datasets previously assigned to failed first coupling facility 302 are assigned to a new storage location by first invalidating buffers associated with the dataset or dataset previously assigned to failed first coupling facility 302. Next, the present invention moves a control structure (e.g. dataset control block structure 406) of the data previously assigned to failed first coupling facility 302 to a cache control block structure representing the new storage location. Also, the present embodiment now invalidates the buffers associated with the data set control block structure of the failed coupling facility (e.g. dataset control block structure 406) that was anchored to the cache control block structure (e.g. cache control block structure 402). Further, the dataset control block structure is moved to the cache control structure representing the newly assigned cache structure.

In the present embodiment, the dataset control structure (e.g. dataset control block structure 406) has a memory. As a result, it indicates the original cache structure (cache control block structure 402), and the fact that the dataset was moved because of dynamic cache reassignment. That is, in one embodiment of the present invention, the dataset control structure keeps track of the fact that a dataset was once stored at a particular cache structure, and it also indicates that the dataset was moved due to dynamic cache reassignment. The above-described process is then repeated for each dataset associated with failed first coupling facility 302. In one embodiment, the above-described process is executed in parallel for each dataset in failed first coupling facility 302.

Figure 6:
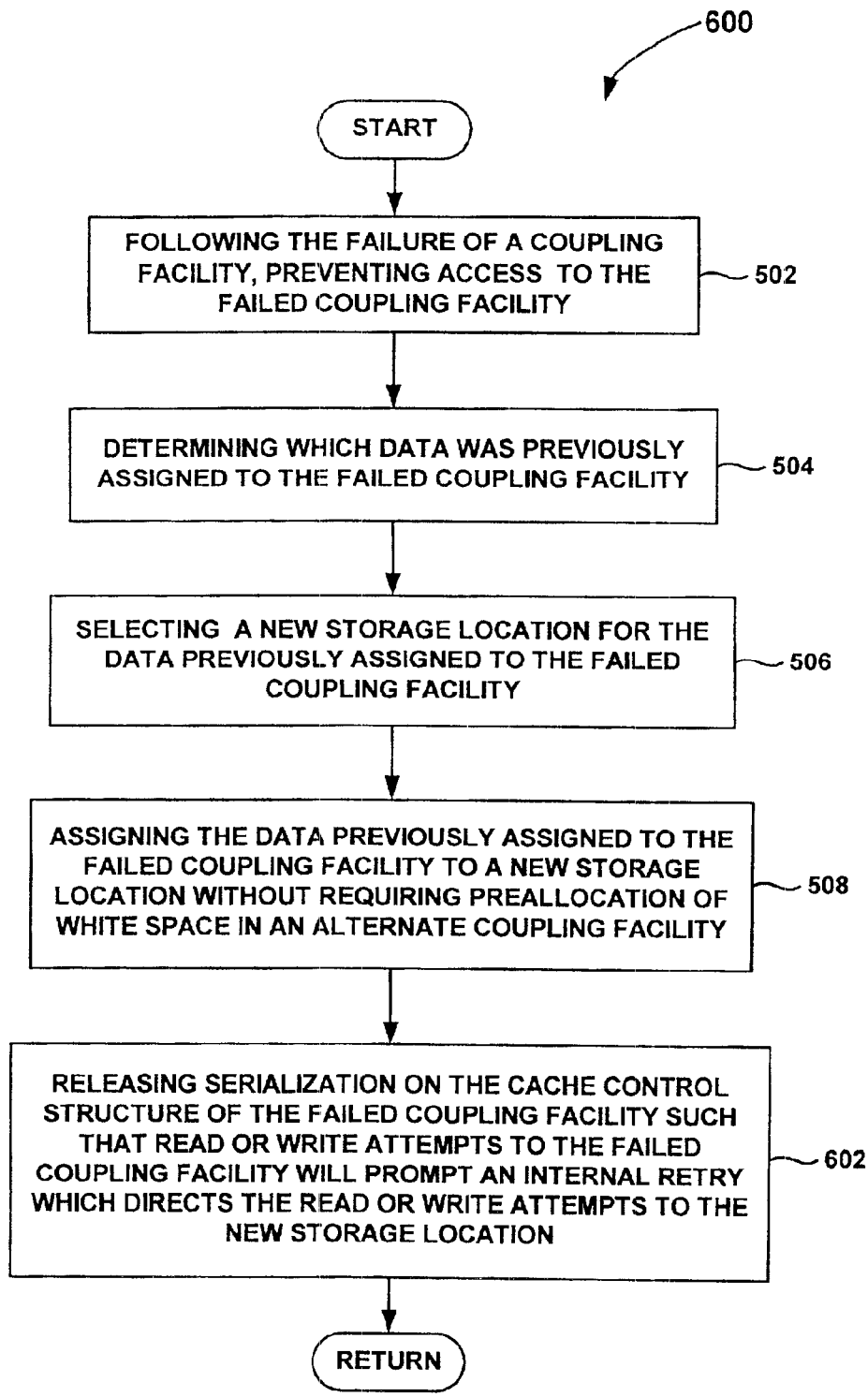
FIG. 6 is a flow chart of steps performed in accordance with another embodiment of the present claimed invention.

With reference now to FIG. 6, a flow chart 600 of steps performed in accordance with another embodiment of the present invention is shown. As shown in FIG. 6, flow chart 600 includes steps 502 through 508 which were described above in detail, and also includes a new step 602. For purposes of brevity steps 502 through 508 are not discussed again herein. At step 602, upon the completion of step 508, the present embodiment recites releasing the serialization on the cache control structure corresponding to the failed first coupling facility 302 such that read or write attempts to failed first coupling facility 302 will prompt an internal retry which directs the read or write attempts to the new storage location. For purposes of the present application, an internal retry occurs when, as a part of the access to data, it is determined that the buffer is invalid; a copy of the data is refetched; and this operation is transparent to the accessor of the data. The internal retry is key to the data accessor determining that something has changed (i.e. moved) and dealing with that change. At this point serialization on failed first coupling facility (302) is released in step 602. Readers and writers which were not able to proceed while the dynamic cache reassignment process was in progress will now determine that their current buffer is invalid, and will refetch a new version of the data. This process is an internal retry executed whenever it is determined that a buffer is invalid, and is transparent to the accessor. Since control structures for the dataset have been moved to a new cache structure, the reader/writer is now using the new cache structure without any awareness of the reassignment.

Additionally, as yet another benefit of the present embodiment, even though "white space" is not reserved, there still will not be a cache full condition. Specifically, in the present embodiment, coupling facility storage is managed with a paging-like process. If the memory of the coupling facility is overcommitted, least recently used data items are discarded and marked as invalid. In so doing, room is made in the coupling facility for new data items. In the present embodiment, when readers and writers see an invalid data item, they refetch a copy of the data item. This can result in some amount of thrashing (i.e. data items constantly discarded to make room for new data items). When there is a loss of a coupling facility, the installation is operating in "degraded" mode (until the coupling facility is repaired). In one embodiment of the present invention, somewhat more storage is allocated to the coupling facility than is actually required such that this "degraded" effect is minimized. The presumption is that the original coupling facility will be repaired quickly, and that the original configuration has to be restored for the workload to achieve its designed response time and throughput. However, in the present invention, the amount of data allocated to the coupling facility is significantly less than the amount of white space reserved in prior art techniques.

In another embodiment, step 602 of the present invention also includes a notification mechanism when a new cache structure is available. For example, assume that failed first coupling facility 302 is repaired, or that a new coupling facility is made available and Cache_01 is now allocated in the repaired coupling facility. The notification causes a scan of all dataset control structures on all cache control structures. The dataset control structure has a memory of its originally assigned cache control structure and a memory of whether it was moved in accordance with the method of the above-described embodiment. For datasets that were moved in accordance with the method of the above-described embodiment, if the original cache structure is now available the method of the above-described embodiment is reinvoked and the dataset is moved back to its original cache structure (e.g. within first coupling facility 302). The nominate cache process in this case is told to select a specific target cache structure (the original first coupling facility 302).

The present invention is also well suited to being implemented a dual operation mode. Upon the failure of a coupling facility, and via an external parameter, a system administrator determines whether to use the method of the present embodiments or conventional rebuild techniques. In one such embodiment, the system administrator can freely switch between the two modes of operation. If there is a switch from the method of the present embodiments to a conventional rebuilding process, the dynamic cache reassigned memory (original failed cache structure, moved by dynamic cache reassignment) is erased.

Thus, the present invention provides, in various embodiments, a method and system for transparently recovering from a coupling facility failure. The present embodiments also provide a method and system which achieve the above while not require allocating white space in a separate and duplicative coupling facility. The present embodiments also provide a method and system which achieve the above accomplishments while being compatible with an existing parallel sysplex configuration.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method for transparently recovering from a coupling facility failure, the method comprising the steps of:
   a) following the failure of a coupling facility, preventing access to the coupling facility;
   b) analyzing a cache control structure of the coupling facility to determine which data was previously assigned to the coupling facility;
   c) performing a nominate cache process to select a new storage location for the data previously assigned to the coupling facility; and
   d) assigning the data previously assigned to the coupling facility to a new storage location, wherein steps a) through d) are performed without requiring preallocation of storage space in the new storage location prior to the coupling facility failure.

2. The method as recited in claim 1 wherein said method comprises recovering from said coupling facility failure in a parallel sysplex configuration.

3. The method as recited in claim 1 wherein said step a) comprises obtaining serialization on a cache control structure of said coupling facility to prevent said access to said coupling facility.

4. The method as recited in claim 3 wherein said step b) comprises analyzing said cache control structure of said coupling facility to determine which of said data was previously assigned to said coupling facility.

5. The method as recited in claim 3 wherein said serialization stops any read or write access to said coupling facility and prevents the assignment of new data to said coupling facility.

6. The method as recited in claim 1 wherein said step c) comprises performing a nominate cache process to select said new storage location for said data previously assigned to said coupling facility.

7. The method as recited in claim 1 wherein said step d) comprises the steps of:
   d1) invalidating buffers associated with said data previously assigned to said coupling facility; and
   d2) moving a control structure of said data previously assigned to said coupling facility to a cache control structure representing said new storage location.

8. The method as recited in claim 7 further comprising the step of:
   e) releasing said serialization on said cache control structure of said coupling facility such that read or write attempts to said coupling facility will prompt an internal retry which directs said read or write attempts to said new storage location.

9. The method as recited in claim 8 further comprising the step of:
   f) providing notification that a replacement for said failed coupling facility is available.

10. The method as recited in claim 1 further comprising the step of:
    e) employing steps a) through d) in a dual operation mode in conjunction with a conventional rebuilding technique.

11. In a parallel sysplex configuration, a method for recovering from a coupling facility failure, said method comprising the steps of:
    a) following the failure of a coupling facility in a parallel sysplex configuration, obtaining serialization on a cache control structure of said coupling facility to prevent said access to said coupling facility;
    b) analyzing said cache control structure of said coupling facility to determine which data was previously assigned to said coupling facility;
    c) performing a nominate cache process to select a new storage location for said data previously assigned to said coupling facility; and
    d) assigning said data previously assigned to said coupling facility to said new storage location, said step of assigning said data previously assigned to said coupling facility to said new storage location further comprising the steps of:
       d1) invalidating buffers associated with said data previously assigned to said coupling facility; and
       d2) moving a control structure of said data previously assigned to said coupling facility to a cache control structure representing said new storage location, said steps a) through d2) performed without requiring preallocation of white space in said new storage location prior to said failure of said coupling facility.

12. The method as recited in claim 11 wherein said serialization stops any read or write access to said coupling facility and prevents the assignment of new data to said coupling facility.

13. The method as recited in claim 11 further comprising the step of:
    e) releasing said serialization on said cache control structure of said coupling facility such that read or write attempts to said coupling facility will prompt an internal retry which directs said read or write attempts to said new storage location.

14. The method as recited in claim 13 further comprising the step of:
    e) releasing said serialization on said cache control structure of said coupling facility such that read or write attempts to said coupling facility will prompt an internal retry which directs said read or write attempts to said new storage location.

15. The method as recited in claim 14 further comprising the step of:
    f) providing notification that a replacement for said failed coupling facility is available.

16. The method as recited in claim 11 further comprising the step of:
    e) employing steps a) through d2) in a dual operation mode in conjunction with a conventional rebuilding technique.

17. A computer readable medium having computer readable code stored thereon for causing a computer to perform the coupling facility failure recovery steps of:

a) obtaining serialization on a cache control structure of a coupling facility in a parallel sysplex configuration to prevent access to the coupling facility subsequent to a coupling facility failure;

b) analyzing a cache control structure of the coupling facility to determine which data was previously assigned to the coupling facility;

c) performing a nominate cache process to selecting a new storage location for the data previously assigned to the coupling facility; and d) assigning the data previously assigned to the coupling facility to the new storage location, wherein steps a) through d) are performed without requiring preallocation of storage space in the new storage location prior to the coupling facility failure.

18. The method as recited in claim 17 wherein said computer readable medium further includes computer readable code stored thereon for causing said computer to perform said steps of recovering from said coupling facility failure in a parallel sysplex configuration.

19. The method as recited in claim 17 wherein said computer readable medium further includes computer readable code stored thereon for causing said computer performing said step a) to obtain serialization on a cache control structure of said coupling facility to prevent said access to said coupling facility.

20. The method as recited in claim 19 wherein said computer readable medium further includes computer readable code stored thereon for causing said computer performing said step a) to cause said serialization to stop any read or write access to said coupling facility and prevent the assignment of new data to said coupling facility.

21. The method as recited in claim 19 wherein said computer readable medium further includes computer readable code stored thereon for causing said computer performing said step b) to analyze said cache control structure of said coupling facility to determine which of said data was previously assigned to said coupling facility.

22. The method as recited in claim 17 wherein said computer readable medium further includes computer readable code stored thereon for causing said computer performing said step c) to perform a nominate cache process to select said new storage location for said data previously assigned to said coupling facility.

23. The method as recited in claim 17 wherein said computer readable medium further includes computer readable code stored thereon for causing said computer performing said step d) to perform the steps of:

d1) invalidating buffers associated with said data previously assigned to said coupling facility; and d2) moving a control structure of said data previously assigned to said coupling facility to a cache control structure representing said new storage location.

24. The method as recited in claim 20 wherein said computer readable medium further includes computer readable code stored thereon for causing said computer to further perform the step of:

e) releasing said serialization on said cache control structure of said coupling facility such that read or write attempts to said coupling facility will prompt an internal retry which directs said read or write attempts to said new storage location.

25. The method as recited in claim 24 wherein said computer readable medium further includes computer readable code stored thereon for causing said computer to further perform the step of:

f) providing notification that a replacement for said failed coupling facility is available.

26. The method as recited in claim 17 wherein said computer readable medium further includes computer readable code stored thereon for causing said computer to further perform the step of:

e) employing steps a) through d) in a dual operation mode in conjunction with a conventional rebuilding technique.

27. A parallel sysplex computer system comprising:

a plurality of computer systems;

a shared direct access storage device coupled to the plurality of computer systems;

a coupling facility coupled to plurality of computer systems;

a processor coupled to the coupling facility;

a computer readable memory coupled to communicate with the processor, wherein processor performs the coupling facility failure recovery steps of:

a) following the failure of the coupling facility, determining which data was previously assigned to said the coupling facility;

b) preventing access to the coupling facility;

c) selecting a new storage location for the data previously assigned to the coupling facility; and d) assigning the data previously assigned to the coupling facility to the new storage location, the step of assigning the data previously assigned to the coupling facility to the new storage location further comprises:

d1) invalidating buffers associated with the data previously assigned to the coupling facility;

wherein steps a) through d) are performed without requiring preallocation of storage space in the new storage location prior to the coupling facility failure.

28. The parallel sysplex computer system of claim 27 wherein said processor performs said step a) by obtaining serialization on a cache control structure of said coupling facility to prevent said access to said coupling facility.

29. The parallel sysplex computer system of claim 28 wherein said processor performs said step b) by analyzing said cache control structure of said coupling facility to determine which of said data was previously assigned to said coupling facility.

30. The parallel sysplex computer system of claim 28 wherein said serialization stops any read or write access to said coupling facility and prevents the assignment of new data to said coupling facility.

31. The parallel sysplex computer system of claim 27 wherein said processor performs said step c) by performing a nominate cache process to select said new storage location for said data previously assigned to said coupling facility.

32. The parallel sysplex computer system of claim 27 wherein said processor performing said step d) further performs the steps of:

d2) moving a control structure of the data previously assigned to the coupling facility to a cache control structure representing the new storage location.

33. The parallel sysplex computer system of claim 29 wherein said processor further performs the step of:

e) releasing said serialization on said cache control structure of said coupling facility such that read or write attempts to said coupling facility will prompt an internal retry which directs said read or write attempts to said new storage location.

34. The parallel sysplex computer system of claim 33 wherein said processor further performs the step of:

f) providing notification that a replacement for said failed coupling facility is available.

35. The parallel sysplex computer system of claim 33 wherein said processor further performs the step of:
   e) employing steps a) through d) in a dual operation mode in conjunction with a conventional rebuilding technique.

36. A method for transparently recovering from a coupling facility failure, said method comprising the steps of:
   a) following the failure of a coupling facility, preventing access to said coupling facility;
   b) determining which data was previously assigned to said coupling facility;
   c) selecting a new storage location for said data previously assigned to said coupling facility; and
   d) assigning the data previously assigned to the coupling facility to the new storage location, the step of assigning data previously assigned to the coupling facility to the new storage location further comprises moving a control structure of the data previously assigned to the coupling facility to a cache control structure representing the new storage location;
   wherein steps a) through d) are performed without requiring preallocation of storage space in the new storage location prior to the coupling facility failure.

37. The method as recited in claim 36 wherein said method comprises recovering from said coupling facility failure in a parallel sysplex configuration.

38. The method as recited in claim 36 wherein said step a) comprises obtaining serialization on a cache control structure of said coupling facility to prevent said access to said coupling facility.

39. The method as recited in claim 38 wherein said step b) comprises analyzing said cache control structure of said coupling facility to determine which of said data was previously assigned to said coupling facility.

40. The method as recited in claim 38 wherein said serialization stops any read or write access to said coupling facility and prevents the assignment of new data to said coupling facility.

41. The method as recited in claim 36 wherein said step c) comprises performing a nominate cache process to select said new storage location for said data previously assigned to said coupling facility.

42. The method as recited in claim 36 wherein said step d) comprises the steps of:
   invalidating buffers associated with said data previously assigned to said coupling facility.

43. The method as recited in claim 42 further comprising the step of:
   e) releasing said serialization on said cache control structure of said coupling facility such that read or write attempts to said coupling facility will prompt an internal retry which directs said read or write attempts to said new storage location.

44. The method as recited in claim 43 further comprising the step of:
   f) providing notification that a replacement for said coupling facility which failed is available.

45. The method as recited in claim 36 further comprising the step of:
   e) employing steps a) through d) in a dual operation mode in conjunction with a conventional rebuilding technique.

* * * * *

UNITED STATES PATENT AND TRADEMARK OFFICE
CERTIFICATE OF CORRECTION

PATENT NO. : 6,910,153 B2  
APPLICATION NO. : 10/039355  
DATED : June 21, 2005  
INVENTOR(S) : Kenneth Michael Kapuka et al.

Page 1 of 1

It is certified that error appears in the above-identified patent and that said Letters Patent is hereby corrected as shown below:

Column 1,  
Line 44, "sysp0lex" should read -- sysplex --.

Column 11,  
Line 8, "to selecting" should read -- to select --.

Column 12,  
Line 14, "to plurality" should read -- to the plurality --.

Column 12,  
Line 18, "wherein processor" should read -- wherein the processor --.

Column 12,  
Line 21, "to said the" should read -- to the --.

Signed and Sealed this

Twenty-sixth Day of December, 2006

JON W. DUDAS  
*Director of the United States Patent and Trademark Office*